Jan. 12, 1971  T. J. WINDLE  3,554,006
QUICK BURST PIPE TESTER

Filed April 28, 1969  2 Sheets-Sheet 1

INVENTOR.
T. J. WINDLE

BY *Young & Quigg*

ATTORNEYS

Jan. 12, 1971 T. J. WINDLE 3,554,006
QUICK BURST PIPE TESTER
Filed April 28, 1969 2 Sheets-Sheet 2

INVENTOR.
T. J. WINDLE
BY Young & Quigg
ATTORNEYS

United States Patent Office 3,554,006
Patented Jan. 12, 1971

---

3,554,006
QUICK BURST PIPE TESTER
Tom J. Windle, Bartlesville, Okla., assignor to Phillips
Petroleum Company, a corporation of Delaware
Filed Apr. 28, 1969, Ser. No. 819,616
Int. Cl. G01n 3/12
U.S. Cl. 73—49.5                      6 Claims

---

ABSTRACT OF THE DISCLOSURE

Apparatus for determining the short-time rupture strength of plastic pipe and fittings uses a variable speed motor to control the rate of pressure increase on a closed hydraulic system until the plastic sample ruptures. The drive shaft of the motor adjusts the regulating knob of a pressure regulator so that the output pressure from the regulator is increased, and this pressure is applied to the hydraulic system.

---

The American Society for Testing and Materials (A.S.T.M.) has devised a standard method of testing the short-time rupture strength of plastic pipe, and fittings. The method involves loading a specimen to failure in a short-time interval (60–90 seconds) by means of continuously increasing internal hydraulic pressure while the specimen is immersed in a controlled temperature environment (either in a water or other fluid bath). The data obtained are of use in predicting the behavior of the pipe and fittings under conditions of temperature, time, method of loading, and hoop stress similar to those used in the actual test. However, this testing method has not been utilized beneficially to any great extent because of the lack of suitable equipment and a procedure for carrying out this method in an accurate, repeatable manner. The major drawback in this regard has been the need to control accurately the rate of pressure increase during the test. Since the testing procedure merely calls for continuously increasing the pressure until the pipe fails, this requirement can be satisfied even though the rate of pressure increase may vary considerably during the timed testing period. Thus, with the same piece of pipe, greatly varying rupture strength values can be obtained using the A.S.T.M. testing method, depending on how the rate of pressure increase is varied.

In accordance with the present invention, a system is provided for automatically carrying out a short-time rupture strength test to completion using a variable speed motor to increase the hydraulic pressure uniformly with respect to time until rupture of the sample occurs.

Figure 1:
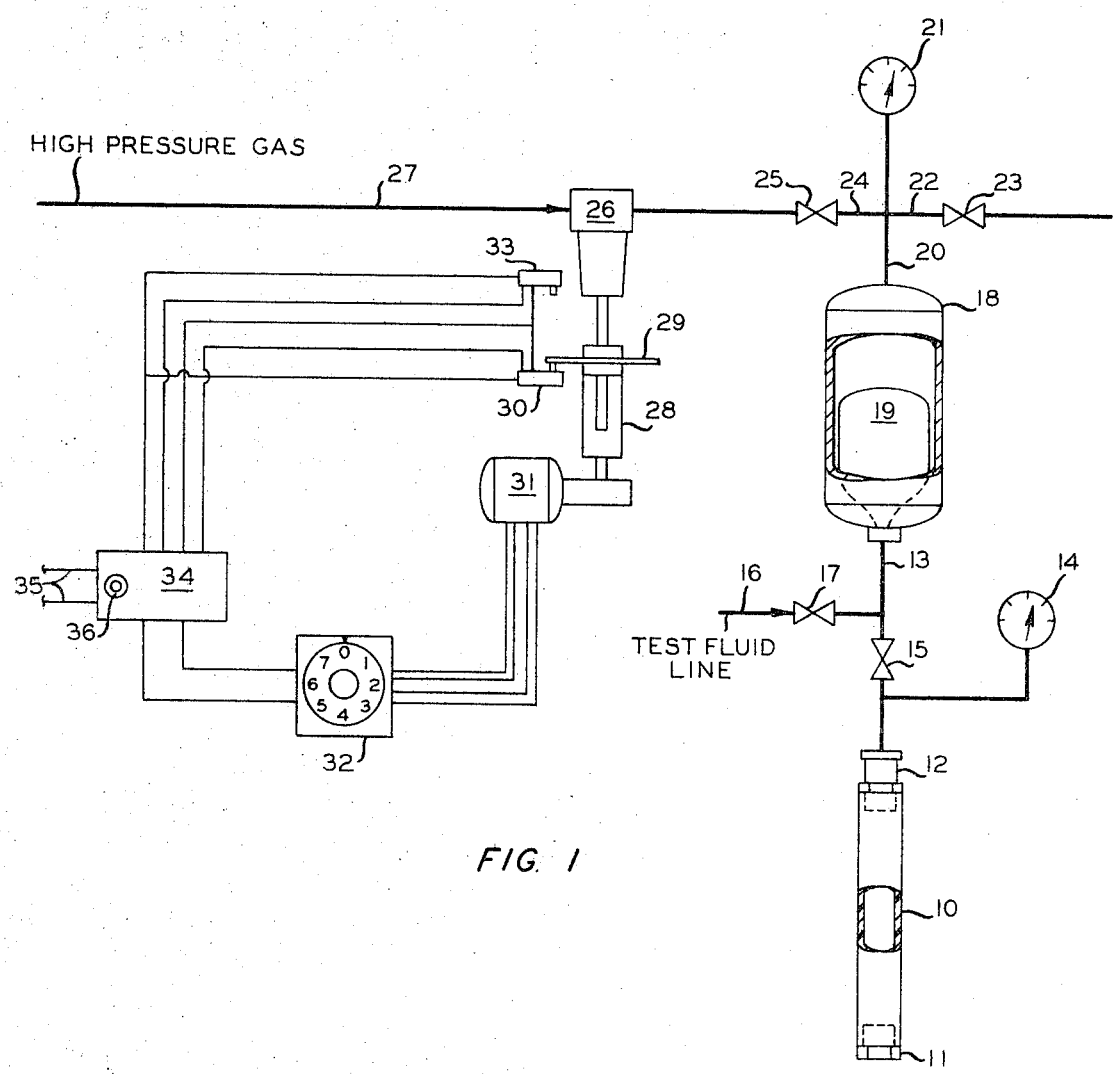
Figure 3:
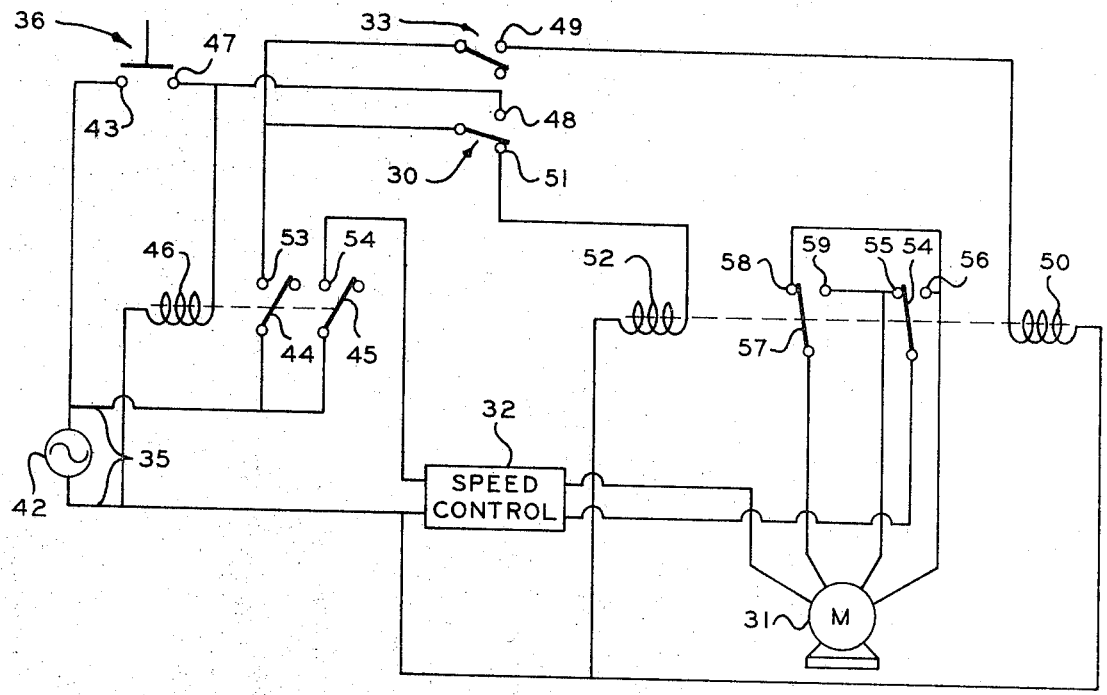
Figure 2:
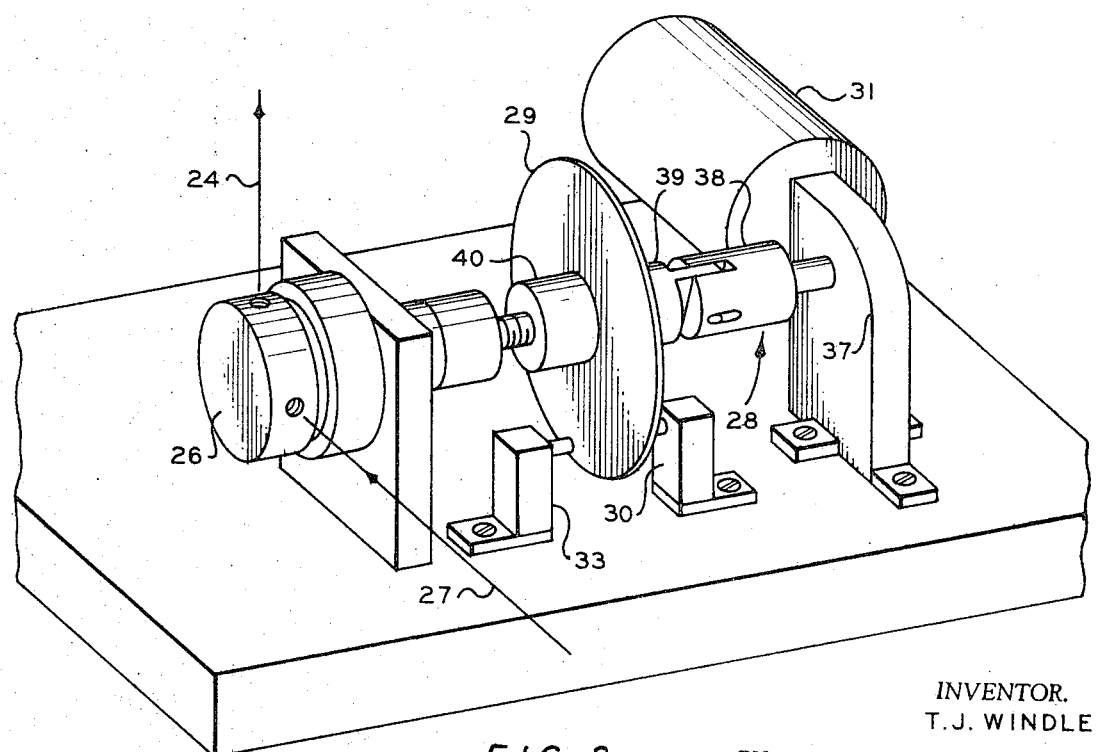

In the drawing, FIG. 1 is a schematic representation of an embodiment of the apparatus of this invention. FIG. 2 is a perspective view of the pressure increase drive mechanism. FIGURE 3 is a schematic circuit drawing of the electrical components.

Referring now to the drawing in detail and to FIG. 1 in particular, there is shown a pipe tester which can be utilized to determine the short-time rupture strength of plastic pipe and fittings according to the A.S.T.M. testing method (D1599–62T). A pipe sample 10 is capped at one end by plug member 11 and at the other end by a plug member 12, the latter having an opening formed through its interior so that a liquid can be passed into the otherwise sealed interior of the sample. Attached to the opening in plug member 12 is a high pressure conduit 13 through which a hydraulic fluid, usually water, can be passed to stress the pipe sample. A pressure gauge 14 is connected to conduit 13 to read the pressure applied to the pipe sample. A valve 15 in conduit 13 remains open while the test is being performed. Liquid is passed into conduit 13 from a supply conduit 16 in which valve 17 is located. An accumulator 18 with an internal elastic bladder means 19 (or movable piston) is attached to conduit 13 and forms the primary reservoir for the test fluid which fills the internal hydraulic system before a test is performed. A high pressure conduit 20 leads from the top portion of accumulator 18. A pressure gauge 21 and a bleed line 22, with a valve 23 connected thereto, are connected to coduit 20. Conduit 20 also connects with a conduit 24 in which a valve 25 is positioned. High pressure gas is supplied by a conduit 27 which is connected to the inlet of a pressure regulator 26. The outlet of pressure regulator 26 is connected to conduit 24.

Pressure regulator 26 functions to increase the pressure within conduit 24 at a uniform rate during operation of the testing apparatus. To this end, a reversible motor 31 is employed to adjust the regulating knob of pressure regulator 26. A telescoping drive means 28 is connected between motor 31 and regulator 26. Drive means 28 carries a rotatable disk 29 which engages a switch 30 in one position and a switch 33 in a second position. Switches 30 and 33 are connected to a control circuit 34 in such a manner as to adjust the direction of rotation of motor 31. An adjustable speed control mechanism 32 is provided to permit the speed of motor 31 to be varied. Electrical leads 35 are connected to an external power supply, and the apparatus is provided with a starter button 36.

As illustrated in FIG. 2, the drive shaft of motor 31 is connected to a gear box 37, as is the drive shaft of drive means 28. Drive means 28 is thus rotated when motor 31 is energized. The drive means includes a first member 38 which has a slit in one end to receive a driven member 39. Disk 29 is carried by member 38. A rotatable member 40 is connected to member 39 so as to be rotated therewith. Member 40 actually constitutes the adjusting knob of pressure regulator 26 so that rotation of this knob increases or decreases the output pressure of the regulator, depending on the direction of rotation. Thus, rotation of motor 31 in a first direction to move disk 29 from switch 30 toward switch 33 serves to increase the output pressure of the regulator. Similarly, movement in the opposite direction serves to decrease the pressure.

As illustrated in FIG. 3, leads 35 are connected to a power source 42. One of the power leads 35 is connected to a first terminal 43 of switch 36 and to switches 44 and 45, the latter being actuated by a solenoid 46 being energized. The second power lead is connected to the second terminal 47 of switch 36 through solenoid 46. Terminal 47 is connected to a terminal 48 which is adapted to be engaged by switch 30. Switch 30 is connected directly to switch 33. Switch 33 is adapted to engage a terminal 49 which is connected through a solenoid 50 to power supply 32. In one position, switch 30 is adapted to be connected to a terminal 51 which is connected through a solenoid 52 to power supply 42. When solenoid 46 is energized, switches 44 and 45 engage respective terminals 53 and 54. Terminal 53 is connected to switches 30 and 33, and terminal 54 is connected to one input of speed control 32. The second input of speed control 32 is connected to power supply 42. The first output terminal of speed control 32 is connected directly to one terminal of motor 31. The second output terminal of speed control 32 is connected to a switch 54. Switch 54 engages a terminal 55 when solenoid 52 is energized and a terminal 56 when solenoid 50 is energized. Similarly, a switch 57 engages a terminal 58 when solenoid 52 is energized and a terminal 59 when solenoid 50 is energized. Switch 57 is connected directly to a terminal of motor 31. Terminals 56 and 58 are connected to one another and to a terminal of motor 31. Switches 55 and 59 are connected to one another and to a terminal of motor 31. When solenoid 52 is energized, motor 31 is connected to rotate in a first direction. When solenoid 50 is energized, motor 31 is connected to rotate in the opposite direction.

In operation, a pipe sample of prescribed length is capped at each end with plug members 11 and 12 and is connected to high pressure conduit 13. Valve 23 in bleed line 22 is opened to vent any gases on the gas side of the accumulator 18. Next valve 17 is opened to allow the test fluid to fill the enclosed hydraulic system which comprises the elastic bladder means 19, conduit 13 and the internally enclosed section of the pipe sample 10. Then valve 17 is closed, as is valve 23. The high pressure gas supply source 27 can be nitrogen at a pressure of approximately 2000 p.s.i.g., for example. Speed controller 32 is adjusted so that a uniform pressure increase in conduit 24 will create enough hydraulic pressure to achieve a break in the sample within the 60–90 second period (for example, 700 p.s.i.g. in 80 seconds). A calibration chart can be prepared for various sizes and types of samples so that a proper speed controller setting can rapidly be established for each sample.

It is assumed that drive mechanism 28 initially is in the position illustrated in FIG. 1. In this position, pressure regulator 26 is set so that there is a zero or a very low output pressure. Starter button 36 is depressed to energize motor 31 to rotate drive mechanism 28 and thereby increase the output pressure from the regulator at a uniform rate. With reference to FIG. 3, closure of switch 36 energizes solenoid 46 so that power is supplied to the motor through switch 45. Switch 44 is closed at this same time to energize solenoid 52. This moves switches 54 and 57 into engagement with respective terminals 55 and 58 so that motor 31 is connected for rotation in a first direction. As soon as disk 29 moves out of engagement with switch 30, switch 30 (which can be spring loaded) moves upwardly to engage terminal 48. This serves to connect power to solenoid 46 independently of switch 36 so that the solenoid remains energized after switch 36 is opened. The pressure in conduit 24 increases at a uniform rate as motor 31 rotates, and the resulting increased pressure is terminated to the interior of sample 10 by means of the hydraulic system. As previously mentioned, pressure regulator 26 is selected so that the output pressure is sufficient to rupture the sample before disk 29 reaches switch 33. At the time the sample ruptures, the pressure reading of gauge 14 is noted to provide an indication of the pressure required to rupture the sample. After the sample has ruptured, valve 15 is closed so that there is no further loss of test fluid.

When disk 29 reaches switch 33, the switch is closed to energize solenoid 50. This moves switches 54 and 57 into engagement with respective terminals 56 and 59 so as to reverse the direction of rotation of motor 31. Continued rotation of the motor moves disk 29 downwardly until switch 30 is moved from engagement with terminal 48 into engagement with terminal 51. This deenergizes solenoid 46 so that switch 45 is opened to terminate further rotation of motor 31. If the time of failure falls outside of the 60–90 second period, the electronic speed control must be adjusted correspondingly and the test rerun.

EXAMPLE

Six samples of polyethylene pipe were tested according to the procedure described above. Each sample was 19 inches long, had an outside diameter of 1.280 inches and a wall thickness of .0132 inch. The bath in which the samples were submerged for testing was filled with water at 73.4° F. In all cases the internal hydraulic pressure was uniformly increased from zero to the rupture point of the pipe. The rupture in each example consisted of a ductile rip.

The results appear as follows:

| Sample: | Total elapsed time, seconds | Maximum internal pressure, p.s.i.g. |
|---|---|---|
| #1 | 27 | 830 |
| #2 | 65 | 780 |
| #3 | 80 | 776 |
| #4 | 89 | 774 |
| #5 | 120 | 760 |
| #6 | 204 | 740 |

The data obtained reveal that within the allowable 60 to 90 seconds period of the ASTM requirements (samples 2–4) the results are quite accurate and repeatable.

Although the invention has been described in conjunction with a presently preferred embodiment, it should be apparent that it is not limited thereto.

What is claimed is:

1. Apparatus for use in determining the short-time rupture strength of a hollow sample, comprising a hydraulic fluid reservoir having a movable member therein, first conduit means connected to said reservoir to transmit hydraulic fluid from said reservoir to the interior of the sample to be tested, pressure indicating means connected to said first conduit means, adjustable pressure regulating means having an inlet which is adapted to be connected to a source of pressure and an outlet, said pressure regulating means also having an adjusting knob, the setting of which establishes the magnitude of the pressure at said outlet, second conduit means connecting said outlet to said reservoir to exert a pressure on the movable member therein to force hydraulic fluid through said first conduit means, a motor, and means connecting said motor to said knob of said pressure regulating means so that rotation of said motor in a first direction at a uniform speed serves to increase the pressure at the outlet of said pressure regulating means at a uniform rate.

2. The apparatus of claim 1, further comprising speed control means connected to said motor to permit adjustment of the speed at which said motor is rotated.

3. The apparatus of claim 1 wherein said motor is a reversible motor and further comprising first and second switches spaced from one another, means connected to said motor to move between said switches when said motor is rotated, and means responsive to said switches to control the direction of rotation of said motor so that the direction of rotation of said motor is reversed each time said means connected to said motor strikes one of said switches.

4. The apparatus of claim 3 wherein said means responsive to said switches comprises a power source, first, second and third solenoids, third and fourth switches actuated by said first solenoid, a starter switch, means connecting said starter switch and said first solenoid to said power source, means responsive to said third switch being closed to apply power from said source to said motor, means connecting said fourth switch to said first and second switches, means responsive to said second solenoid being energized to connect said motor for rotation in a first direction, means responsive to said third solenoid being energized to connect said motor for rotation in a second direction, means connecting said first switch and said second solenoid to said power source so that said second solenoid is energized when said first switch is engaged by said means connected to said motor, and means connecting said second switch and said third solenoid to said power source so that said second solenoid is energized when said second switch is engaged by said means connected to said motor.

5. The apparatus of claim 1, further comprising pressure indicating means connected to said second conduit means.

6. The apparatus of claim 1, further comprising third conduit means connected to said first conduit means to permit introduction of hydraulic fluid into said reservoir.

References Cited

UNITED STATES PATENTS

| 2,135,721 | 11/1938 | Landenberger | 73—49.5X |
| 3,398,573 | 8/1968 | Lloyd | 73—49.5 |

FOREIGN PATENTS

| 825,783 | 12/1959 | France | 73—49.5 |

LOUIS R. PRINCE, Primary Examiner

W. A. HENRY, Assistant Examiner